April 21, 1970 E. R. P. LEMAN 3,507,983

REPRODUCTION SYSTEM AND METHOD FOR MAGNETICALLY STORED COLOR VIDEO SIGNALS

Filed Nov. 4, 1966

INVENTOR
EUGENE R. P. LEMAN

BY Harvey J. [signature]

ATTORNEY

1

3,507,983

REPRODUCTION SYSTEM AND METHOD FOR MAGNETICALLY STORED COLOR VIDEO SIGNALS

Eugene R. P. Leman, Los Gatos, Calif., assignor to International Video Corporation, Campbell, Calif., a corporation of California Filed Nov. 4, 1966, Ser. No. 592,001
Int. Cl. H04n 1/22
U.S. Cl. 178—5.4 9 Claims

ABSTRACT OF THE DISCLOSURE

A system for regenerating color video signals recorded on magnetic tape in which a local frequency signal for demodulation of the chroma signal is obtained as the output of a controllable oscillator where the control input for the oscillator is generated by phase and frequency comparison between every color burst and the output of the oscillator and in which the control signal for the oscillator is stored between color bursts and applied to the oscillator to maintain the phase and frequency of the oscillator during the interval between color bursts.

Figure 1:
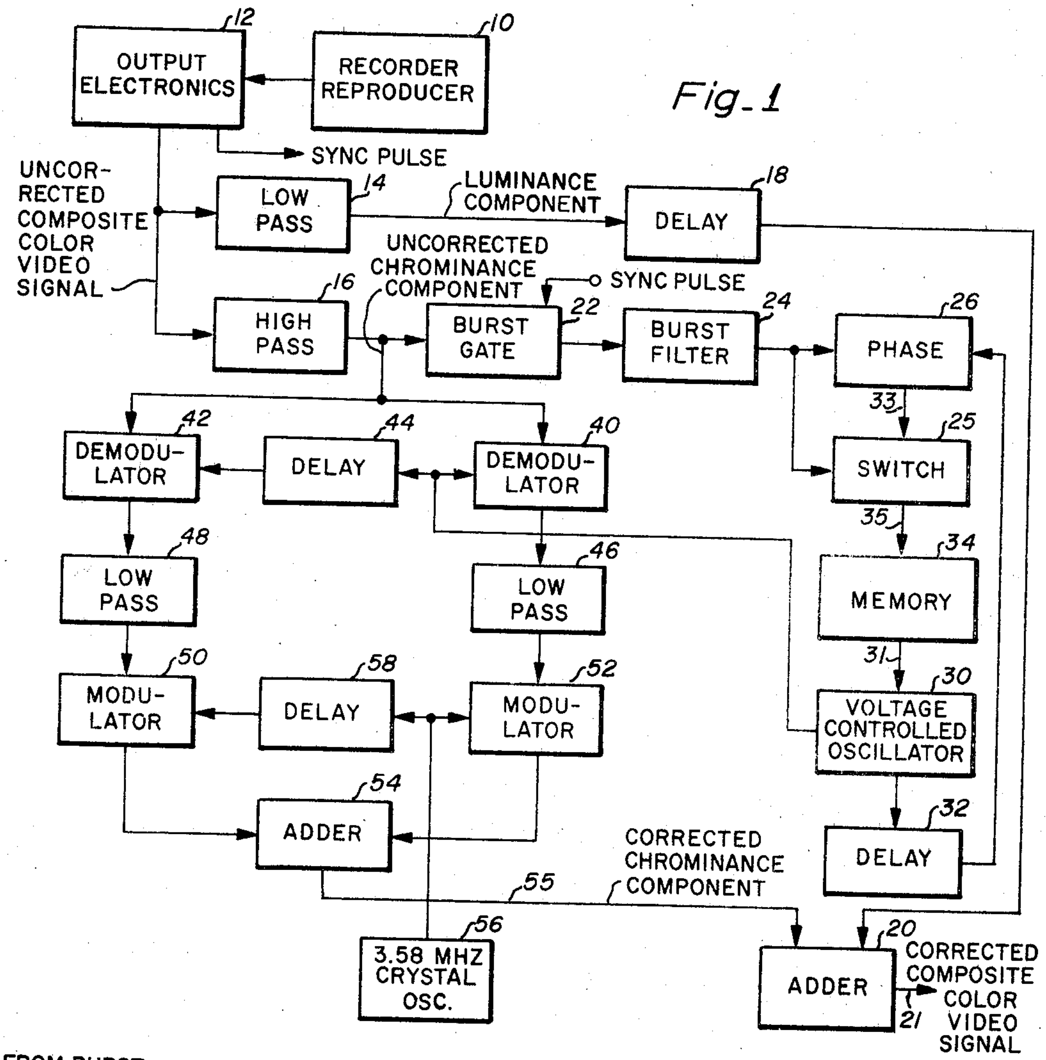

This invention relates to magnetic recording and reproducing systems and methods, and, more particularly, to a reproducing system, and method for such a system, suitable for providing a color corrected color video signal of the general type specified for the "NTSC" system which is now the standard for transmission of color television signals within the United States.

As is well-known by those skilled in the art, the chrominance information of a color video signal is carried by a pair of quadrature signal components which are phase and amplitude modulated upon a color sub-carrier which has a nominal frequency of 3.58 mHz. The color sub-carrier is phase modulated by the color hue information and amplitude modulated by the color saturation information. It has been found that even a 5-degree phase change in the phase of the color sub-carrier used during the subsequent demodulation process with respect to the phase of the original color sub-carrier produces objectionable color changes on the screen of conventional color television receivers.

Because of the objectionable color changes produced when the phase error between the original color sub-carrier and the subsequently utilized demodulating color sub-carrier exceeds 5 degrees, and because conventional color television receivers are widely used and cannot, for economic reasons, each have a complex color correction system, industrial and governmental (FCC) standards have been set up which provide that the ordinary, transmitted color video signal must have a color sub-carrier whose frequency is within $\pm 10$ Hz. of the nominal sub-carrier frequency. This rather stringent requirement is not easily met when the color video signal is reproduced from magnetic tape on which it is stored.

The causes of the timing errors between the recorded and the reproduced color video signal are many and include flutter and wow in the magnetic recording and reproducing system, non-uniform tape motion and tape stretch, changes in tape tension, changes in tape velocity, tape slippage and changes in tape friction due to temperature and humidity. Mechanical elimination of these causes of timing errors, or even their minimization to maintain the time error within the allowable 5-degree phase shift, would be practically impossible, or at least prohibitively expensive.

Heretofore, a number of color video signal correction circuits and correction schemes have been proposed which

2 are utilized in connection with the reproduced color video signals and which are particularly useful for television tape recorders utilizing transverse recording by means of a transversely rotating disc carrying four magnetic heads. A summary of a number of such color correction circuits is presented in Chapter 9 of "Video Tape Recording" by Julian Bernstein, published by John F. Ryder (1960). These correction circuits, however, are primarily limited to recording systems having small inherent absolute timing errors as is the case with "professional quality" equipment which utilize much control circuitry and which are therefore very expensive. These color correction systems have been found unsuitable for lesser quality recorders which exhibit larger timing errors. These color correction systems likewise have generally been found unacceptable for any helical scan recording systems because of the larger inherent timing errors due to less rigid scanning speed control.

One color video signal correction circuit which overcomes some of the above-described limitations is disclosed in U.S. Letters Patent No. 3,114,001, dated Dec. 10, 1963. In accordance with that patent, the chrominance information is corrected, line by line, by producing a local carrier frequency signal and demodulating each line with that local carrier frequency signal. The local carrier frequency signal is derived from an oscillator which has a natural frequency equal to the nominal color sub-carrier frequency and which is frequency and phase controlled, but only during the occurrence of the color burst, directly by the color burst. The controlled sub-carrier frequency oscillator is quenched just prior to the occurrence of the color burst to become non-oscillating. The color burst is then applied to the grid of the oscillator tube to excite the tuned circuit and to cause the oscillator to oscillate in phase with and at the frequency of the color burst. At the termination of the color burst, the oscillator will continue to oscillate but its frequency, being no longer controlled, will almost instantaneously return to the natural frequency of the now uncontrolled oscillator.

The color video signal correction circuit just described has the advantage of reducing cost and complexity of the standard color correction circuits, but retains its major limitation of being unsuitable for recording-reproducing systems having large absolute time errors. The term absolute time error refers to the phase difference between the color sub-carrier used for demodulation and the original modulating color sub-carrier. This limitation is due to the fact that after the end of the color burst, the frequency of the local sub-carrier frequency signal immediately returns to the natural frequency of the oscillator which is near the frequency of the original color sub-carrier. If the timing error is large, this frequency shift will produce a phase shift in excess of the acceptable phase shift of 5 degrees prior to the arrival of the next color burst and produce objectionable color changes in the received signal.

It is therefore a primary object of this invention to provide a reproducing system and method suitable for reproducing color video information in which the effect of the phase errors is reduced to provide acceptance on standard color television monitors and sets.

It is another object of the present invention to provide a reproducing system and method which electronically corrects the phase error without reference to the absolute phasing error in the system. In other words, the system and method of this invention senses the actual received phase of the color burst and applies the correction in accordance with the color burst no matter what the timing error of the received color burst is with respect to the original color sub-carrier.

It is another object of the present invention to provide a reproducing system and method for electronically correcting phase and timing errors of the color portion of a color video signal which arise during the recording, storing and reproducing of the signal.

It is still another object of the invention to provide a color television reproducing system and method in which the uncorrected chromaticity signal is demodulated, line by line, to form the component chrominance signals from which all timing errors have been eliminated.

It is still another objects of the present invention to provide a color television reproducing system and method which is capable of correcting for large absolute timing errors and which is therefore suitable for use with recording systems which have inherently large absolute timing errors, or recording systems which are built to less rigid standards than professional quality systems and therefore are subject to larger absolute timing errors.

It is still another object of the present invention to provide a color television signal reproducing system and method in which each succeeding color burst is utilized to control the phase and frequency of a local frequency signal which demodulates the chromaticity signal and in which a memory device with a long time constant is utilized between color bursts to remember the phase (and frequency) established by the color burst and to maintain the so established phase during the interval between succeeding color bursts.

Briefly, the instant invention accomplishes the objects by utilizing a voltage controlled color sub-carrier oscillator and controlling its output frequency and phase through a memory device, such as an RC time constant circuit. The oscillator provides the local frequency CW signal for demodulating the chromaticity signal. The frequency of the oscillator is controlled by comparing the received color burst with the locally generated color sub-carrier signal in a phase detector which provides a phase difference or error signal during the occurrence of the color burst. This error signal is used to control the local frequency generator and either speed up or slow down the generated sub-carrier signal to bring the same in step with the color burst. This error signal is also stored in the memory device to maintain the frequency of the local reference signal substantially constant during the period of time between successive color bursts.

In the preferred embodiment of the invention, the memory device is isolated from the phase detector after the end of the color burst to ensure minimum leakage from the memory device during the time between color bursts. Since the oscillator generating the local reference signal is constrained, between successive color bursts, to continue oscillating at a frequency which is in step (or very close thereto) with the last color burst, the invention makes it possible to correct for small and large absolute timing errors since the changes in phase between succeeding bursts are generally much less than the absolute timing error.

Further objects and advantages of the present invention will become apparent to those skilled in the art to which the invention pertains as the ensuing description proceeds.

Figures 2, 3:
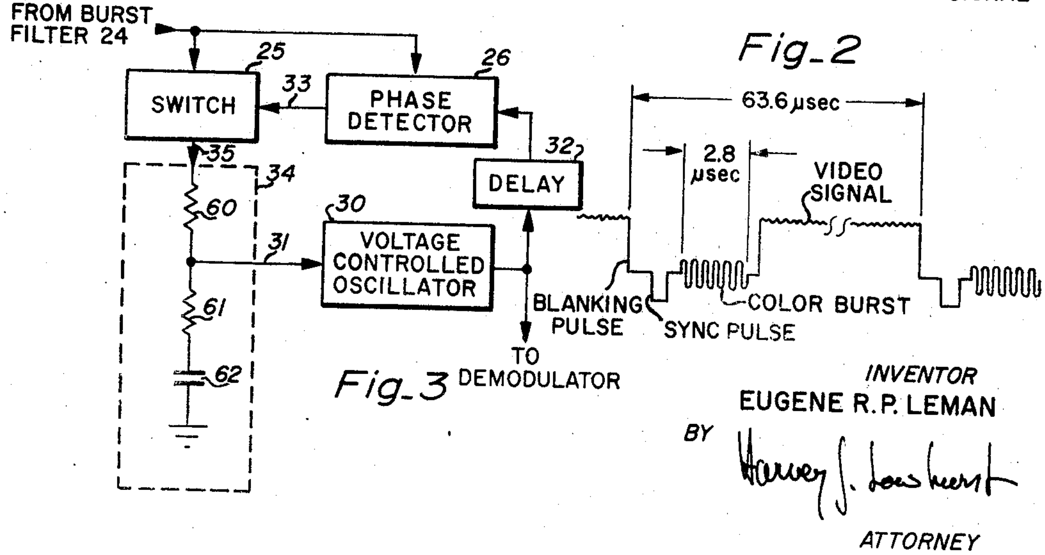

The features of novelty that are considered characteristic of this invention are set forth with particularity in the appended claims. The organization and method of operation of the invention itself will best be understood from the following description when read in connection with the accompanying drawing in which:

FIGURE 1 is a schematic block diagram of a magnetic tape reproducing system incorporating the present invention;

FIGURE 2 is an illustrative diagram of one line of a composite color video signal which is useful in explaining the instant invention; and FIGURE 3 is a diagram, partially in block and partially in circuit form, of one circuit for developing and maintaining the local carrier frequency signal, utilized for demodulating the reproduced chromaticity signal into the two color components, in phase with the original color sub-carrier.

Referring now to the drawings, and particularly to FIGURE 1, there is shown a magnetic memory recorder-reproducer system, generally designated by reference character 10, which may take the form of any device capable of recording and reproducing of color video signals. For example, recorder-reproducer system 10 may be a device using a magnetic tape, drum or disc as the magnetic memory and generally includes an output transducer means for converting the magnetically stored video signal into an electrical signal, means for moving the transducer means relative to the magnetic memory for scanning action, and circuitry for controlling the scanning. Even though recorder-reproducer system 10 may take any of the above-mentioned forms, the invention will be described with particular emphasis on a magnetic tape device of the helical scan type in which a longitudinal moving magnetic tape is wrapped around the peripheral surface of a stationary cylindrical mandrel, in screw-like fashion, and in which a transversely rotating center portion of the mandrel carries one or more magnetic transducers.

The output signal from recorder-reproducer 10 is the composite color video signal which includes the horizontal blanking pulse containing the horizontal sync pulse and the color burst. The composite color video signal is applied to the reproducer output electronics, generally designated by reference character 12, which typically includes a video pre-amplifier for providing an amplified composite video color signal and conventional control circuitry for deriving the sync pulse.

The amplified composite video color signal, provided by output electronics 12, is uncorrected and includes timing and phasing errors which, in case of the chrominance component, cannot be directly applied to a utilization device such as "standard" color receiver, or to a television transmitter for retransmission, since such color receivers or monitors are not constructed to properly recover the chrominance information to form a satisfactory image. These errors, as already explained, may arise from stretching or contraction of the tape, wear of the heads, variations in scanning speed, and factors which change the phasing between recording and reproducing.

The uncorrected composite color video signal is applied to a low-pass filter 14 which typically passes frequencies up to about 3 mHz. and to a high-pass filter 16 which typically passes frequencies above 3 mMz. Filters 14 and 16 thereby separate the uncorrected composite color video signal, respectively, into the luminance component, also referred to as the "Y" signal, and the chrominance component, also referred to as the "chroma" signal. The luminance component is suitably delayed by a time delay network 18 and is thereafter applied either directly to a standard black and white receiver or to a mixer 20 which, as will be explained hereinafter, develops the corrected composite color video signal on mixer output lead 21 for retransmission over a suitable data link to a color receiver.

The uncorrected chrominance component is applied to a conventional burst gate 22 which is controlled by the sync pulse developed by output electronics 12 and which opens gate 22 during the time of occurrence of the color burst. The gated color burst is filtered by a conventional color burst filter 24, which typically has a narrow bandpass of about 100 kHz. about the nominal burst signal center frequency of 3.58 mHz. The filtered and gated color burst is then applied to one of the two input terminals of a phase detector 26 and to a switch means 25 which is placed in the output circuit of detector 26.

There is also provided a voltage controlled oscillator 30 which supplies a local carrier frequency signal having a nominal frequency of 3.58 mHz. and which is variable by means of a control signal applied to lead 31. A suitable voltage controlled oscillator for practicing the invention is an oscillator whose frequency is controlled by a reactance tube which is so arranged as to draw a reactive current that is varied in accordance with the error signal. This reactive current has an effect which is equivalent to shunting a reactance across the oscillator tank circuit, and thereby effects the generated frequency.

The local carrier frequency signal is applied to the other terminal of phase detector 26 for comparison with the color burst. Phase detector 26 may take any of the well-known configurations which compares the phase of a pair of signals applied thereto and which develops a difference signal along its output lead 33 which is commensurate with the phase difference of the applied signals. For example, one detector is illustrated in FIGS. 25–27, page 1010, Electronic and Radio Engineering, by Frederick E. Terman (4th ed.) McGraw-Hill Book Company (1955), and another detector is illustrated in FIG. 5.28, page 138, Color Television Fundamentals by Milton S. Kiner (2nd ed.) McGraw-Hill Book Company (1964). Accordingly, phase detector 26 compares the phrase of the gated and filtered color burst with the phase of the local carrier frequency signal and develops a difference signal commensurate with the instantaneous phase error during the occurrence of the color burst.

The function of delay 32 is to provide a 90-degree phase shift to the local carrier frequency signal since most of the well-known phase detectors provides a "zero" signal when the applied signals are 90 degrees out of phase with one another. The phase error signal appearing on detector output lead 33 is applied, through a color burst controlled switch means 25 (often directly incorporated in the phase detector circuit) to a memory device 34 for storage to control oscillator 30 during the absence of the color burst. The control signal so stored and applied to oscillator input lead 31 is of the proper polarity and magnitude to first bring, and thereafter maintain, the local reference signal in phase and frequency lock with the color burst.

The uncorrected chroma signal from high-pass filter 16 is also applied to a quadrature decoder means comprising a pair of demodulators 40 and 42. The demodulating signal is derived from oscillator 30 in the form of the local carrier frequency signal and is applied directly to demodulator 40, and through a 90-degree delay means 44 to demodulator 42. The demodulated chroma signal now comprises two quadrature components, which, depending on the demodulating axis used, are the standard "X" and "Z" or "Q" and "I" color components. The chroma signal components are passed through low-pass filters 46 and 48, respectively, which typically have a cut-off frequency of 500 kHz. and which remove all traces of the local carrier frequency signal. The chroma signal components may now be applied directly to a standard monitor or receiver, or may be modulated once more on a color sub-carrier having a nominal 3.58 mHz. frequency for forming the corrected chrominance component of the composite video color signal.

More particularly, if it is desired to form a corrected composite video color signal, the two chrominance components are applied to an encoder means comprising a pair of modulators 50 and 52 whose output signals are summed by an adder means 54. Adder means 54 combines the modulated quadrature chrominance components to provide a corrected chroma signal on output lead 55. The carrier utilized is a new color sub-carrier derived from a crystal controlled oscillator 56 which provides a signal having the nominal frequency of 3.58 mHz. This new color sub-carrier signal is directly applied to modulator 52, and through a suitable 90-degree delay means 58 to modulator 50. In this manner, the quadrature components of the chroma signal are modulated on a stable, crystal controlled 3.58 mHz. sub-carrier, and adder means 54 provides the composite chroma signal which closely resembles the original chroma signal, except for the bandwidth.

To reconstruct the composite video color signal, the delayed luminescent signal from delay 18 and the corrected chroma signal from adder means 54 are combined by an adder means (or mixer) 20 to form the corrected composite video color signal on adder output lead 21. This corrected composite video color signal may now be transmitted for reception by color receivers or may be directly applied to such receivers, and is independent of the timing and phasing errors introduced by the magnetic storage of the video color signal.

FIGURE 3 shows one embodiment of memory device 34 which takes the form of an RC time constant network and comprises a series resistor 60 and a shunt resistor 61 in series with a shunt capacitor 62. As will become better understood hereinafter, memory device 34 is connected between the output terminal of phase detector 26 and oscillator 30 through a switch means 25, and the impedances of its components are selected to provide one time constant with switch means 25 in its closed position and another time constant with switch means 25 in its open position.

The operation of the combination of phase detector 26, switch means 25, memory device 34 and oscillator 30 will now be explained. Preliminarily, it is well to keep in mind that the standard composite video color signal includes a blanking pulse which separates adjacent video signal lines and which carries the sync pulse. The back porch of each sync pulse carries a minimum of 8 cycles of the color burst so that the color burst duration is about 2.8 microseconds. Since the period of the blanking pulse (the length of a line) is about 15,750 Hz., the length of a composite video signal line is about 63.6 microseconds. By subtracting the duration of the color burst from the duration of a composite video signal line, it becomes evident that a phase reference is absent for 60.8 microseconds or about 95% of the time. This is shown graphically in FIGURE 2.

One of the primary features of the present invention is to provide means for a phase reference during the 95% period of the composite video color signal during which the burst signal is absent. This is accomplished by providing a local carrier frequency oscillator whose output frequency is controllable over a range which corresponds to the largest anticipated absolute timing error, which may be of the order of 20 kHz. on either side of the nominal color burst frequency. The oscillator is controlled by the error signal from the phase detector when the color burst is present to provide a local carrier frequency signal in phase and frequency lock with the color burst. Thereafter, and, more specifically, for the next 60.8 microseconds when the color burst is absent, the oscillator is controlled by the memory device which maintains the phase and frequency of the local carrier frequency signal within 5 degrees or less of the phase of the immediately preceding color burst. Since at the end of the occurrence of the color burst the local carrier frequency signal is in, or at least near, frequency and phase lock with the color burst, the phase (and frequency) of the local carrier frequency signal is maintained within the 5 degrees allowable tolerance by either keeping the frequency constant or by limiting the frequency drift, between successive color bursts, to one which is less than the allowable tolerance.

During the absence of the color burst there is, of course, no reference against which the phase may be compared. On the other hand, most of the phenomena giving rise to timing and phasing errors are relatively slow in frequency compared to the period of one line. In practice, therefore, the timing change between sucessive lines (relative timing error) is small, even though the absolute timing error, that is, the frequency and phase error between the color burst as recorded and as reproduced, may be large.

As the color burst occurs, detector 26 compares the phase of the color burst with the local carrier frequency signal and develops an error (or difference) signal on lead 33 which is commensurate with the detected phase difference. The color burst also opens switch 25, which may be in the form of a diode gate operated by a pulse derived from the sync pulse or by a properly designed phase detector which is keyed by the color burst itself. Closing of switch 25 allows the error signal on lead 35 to charge up capacitor 62 through resistors 60 and 61 and to thereby develop the oscillator control signal. This charge, which may be positive or negative, is applied via lead 31 to the control terminal of oscillator 30. Responsive to the oscillator control signal, oscillator 30 will increase or decrease its frequency, as the case may be, until the local reference signal is in phase and frequency lock with the color burst.

At the termination of the color burst, switch 25 opens and thereby isolates memory device 34 from the phase detector, and the charge on capacitor 62 provides the control signal. Since the next color burst will take place 60.8 microseconds later, it becomes necesary to maintain the control signal within the limits which prevent the local reference signal from changing its phase and frequency by more than the allowable 5 degrees during this time interval. This criteria is used in determining the minimum permissible time constant of memory device 34 with switch 25 in its open position. This time constant may be termed the "line" time constant as defining the time constant of memory device 35 between color bursts. The larger the line time constant, the smaller will be the change of the frequency of the local oscillator between successive color bursts.

During the time interval between the occurrence of the immediately past and the next color burst, the absolute timing error of the system may have increased, or decreased, or remained constant. There is, of course, no way of knowing what changes in the absolute timing error will occur when advancing from one line to the next. However since changes in the relative timing errors are usually slow compared with the line frequency and since the frequency drift of the local frequency signal is limited by the minimum line time constant, the timing error between the local reference signal and the next color burst will likewise be small.

Since capacitor 62 must store the new error signal to reflect the required correction for a phase and frequency lock, the time constant of the RC network with switch 25 in its closed position must be selected to be sufficiently small so that capacitor 62 can follow the phase detector output without lagging behind by a phase error of more than 5 degrees. This then is the criteria for the maximum permissible time constant of memory device 34. This time constant may be termed the "burst" time constant as defining the time constant of memory device 35 during the occurrence of the color burst, or during the time the error signal is developed. The smaller the burst time constant the faster will be corrective action from the local frequency oscillator.

The quantitative criteria for selecting the minimum line time constant and the maximum burst time constant are as follows: A phase change in excess of about ±5 degrees for the burst frequency is known to produce a noticeable hue shift on playback. Since the burst repetition frequency is 15.734 kHz., this ±5-degree change corresponds to a maximum shift of ±218 Hz. as shown by the following calculations:

$$\frac{A\times B}{C}=\frac{5\times 15.734}{360}=218\text{ Hz.}$$

where:
$A$=5-degree change
B=burst repetition frequency
$C$=360 degrees

It follows, therefore, that the local reference signal ceed ±218 Hz. for each second. Assuming a maximum relative timing charge of the color burst, namely, a rate of change of ±218 Hz. the time constant needed for developing the control signal should not be greater than 1/218 seconds, or approximately 5 milliseconds.

Accordingly, both the minimum line time constant and the maximum burst time constant of memory device 34 should be approximately 5 milliseconds.

The above calculations can be generalized by making A equal to X degrees in which case the permissible time constant becomes 25/X milliseconds per permissible degrees of phase shift. Accordingly, the line time constant is selected to be no smaller than 25/Y milliseconds where Y is the desired minimum phase shift in degrees of the oscillator between bursts, and the burst time constant is selected no larger than 25/Z milliseconds where Z is the largest anticipated relative timing error between color bursts plus the drift of the local frequency oscillator, in degrees. As a practical matter the line time constant is usually very large because of the isolation of memory device 34 during the absence of the color burst, and the burst time constant is selected as 5 milliseconds to take care of phase errors up to 5 degrees.

There has been described a system and a method by which an uncorrected chrominance component of a video color signal is corrected by demodulating the same with a local carrier frequency signal whose phase is established by the immediately preceding color burst and which is maintained within the allowable phase relationship by a memory device which controls the local carrier signal generator. The memory device is reset by each successive color burst and the resetting is independent of the absolute timing error of the color burst with respect to the nominal color burst. Each color burst becomes the sole timing reference for the succeeding line, and the only errors which need to be taken into account are errors between successive color bursts and the drift of the oscillator which is kept very small by a long time constant network. For this reason, the present method and system is ideally suitable for recorder-reproducer systems which have inherent large absolute timing errors.

What is claimed is:

1. The method of demodulating the chroma signal of a composite color video signal where a color burst may have a different frequency from the frequency of a preceding color burst comprising the steps of:
- continuously generating a controllable local frequency signal;
- comparing the phase and frequency of said local frequency signal with the phase and frequency of the color burst during the occurrence of the color burst and deriving an error signal commensurate with the difference in phase and frequency between said local frequency signal and said color burst;
- utilizing said error signal for bringing the frequency and phase of the local frequency signal into phase and frequency lock with the color burst;
- storing said error signal;
- utilizing said stored error signal after the end of the color burst to change the frequency of said local frequency signal to said different frequency when there is a frequency difference between color bursts; and
- employing the so controlled local frequency signal to demodulate the chroma signal immediately following the color burst.

2. A system for demodulating the chroma signal of a composite color video signal where a color burst may have a different frequency from the frequency of a preceding color burst comprising:
- means responsive to said composite color video signal and operative to derive the color bursts and the chroma signal;
- oscillator means responsive to a control signal and operative to provide a local frequency signal whose frequency is a function of said control signal;
- phase comparator means responsive to said color bursts and said local frequency signal and operative to derive an error signal commensurate with the frequency difference between the compared signals;

error signal storage means responsive to said error signal and operative to provide said control signal during the line scan; and demodulator means responsive to said chroma signal and said controlled local reference signal and operative to demodulate said chroma signal to form the color component signals.

3. A system for demodulating in accordance with claim 2 in which the error signal storage means has a burst time constant which is selected in accordance with the maximum anticipated relative timing error between successive color bursts.

4. A system for demodulating in accordance with claim 2 in which the error signal storage means has a line time constant which is selected in accordance with the permissible frequency drift of said local frequency signal between successive color bursts.

5. A system for demodulating in accordance with claim 2 in which the error signal storage means has a burst time which does not exceed 25/Z milliseconds, where Z is the maximum anticipated timing error in degrees between successive bursts.

6. A system for demodulating in accordance with claim 2 in which the error signal storage means has a line time constant which is no less than 25/Y milliseconds, where Y is the maximum allowable drift in frequency of said local reference signal, in degrees, between successive color bursts.

7. A system for demodulating in accordance with claim 2 in which the error signal storage means has a time constant during the presence of the color burst which is as small as possible and does not exceed 25/Z milliseconds, where Z is the maximum anticipated timing error in degrees between successive bursts, and a time constant in the absence of a color burst which is as large as possible and not less than 25/Y milliseconds, where Y is the maximum allowable drift in said local frequency signal in degrees between successive color bursts.

8. A system for demodulation in accordance with claim 2 which further includes a switch means responsive to said color burst for disconnecting said error signal storage means from said phase comparator means during the absence of said color burst whereby the time constant of said error signal storage means is switched from a large time constant to a small time constant during the presence of said color burst.

9. A system for demodulating in accordance with claim 2 which further includes means responsive to said color burst for switching the time constant of said error signal storage means from a first selected value to a second selected value during the absence of said color burst.

References Cited

UNITED STATES PATENTS

| | | | |
|---|---|---|---|
| 2,666,136 | 1/1954 | Carpenter. | |
| 2,743,369 | 4/1956 | Sands | 178—5.4 |
| 2,751,430 | 6/1956 | Kelly | 178—5.4 |
| 2,793,347 | 5/1957 | Clark | 178—5.4 |
| 2,802,045 | 8/1957 | Landon. | |
| 2,916,547 | 12/1959 | Ginsburg et al. | |
| 3,030,438 | 4/1962 | Newell. | |
| 3,100,816 | 8/1963 | Coleman et al. | |
| 3,120,576 | 2/1964 | Andriev. | |

ROBERT L. GRIFFIN, Primary Examiner

R. P. LANGE, Assistant Examiner

U.S. Cl. X.R.

178—6.6